United States Patent
Hernandez et al.

(10) Patent No.: US 10,106,437 B2
(45) Date of Patent: Oct. 23, 2018

(54) METAL REMOVAL SYSTEM

(75) Inventors: Mark T. Hernandez, Boulder, CO (US); Muna Abu-Dalo, Boulder, CO (US); Gautam Khanna, Louisville, CO (US); Al Quick, Wheat Ridge, CO (US)

(73) Assignee: Tusaar Inc., Lafayette, CO (US)

( * ) Notice: Subject to any disclaimer, the term of this patent is extended or adjusted under 35 U.S.C. 154(b) by 684 days.

(21) Appl. No.: 13/177,826

(22) Filed: Jul. 7, 2011
(Under 37 CFR 1.47)

(65) Prior Publication Data
US 2013/0001169 A1  Jan. 3, 2013

Related U.S. Application Data

(60) Provisional application No. 61/362,279, filed on Jul. 7, 2010.

(51) Int. Cl.
*C02F 1/28* (2006.01)
*B01J 20/20* (2006.01)
(Continued)

(52) U.S. Cl.
CPC ............ *C02F 1/288* (2013.01); *B01J 20/20* (2013.01); *B01J 20/3204* (2013.01); *B01J 20/3248* (2013.01); *B01J 20/3255* (2013.01); *B01J 20/3285* (2013.01); *C02F 1/283* (2013.01); *C02F 1/285* (2013.01);
(Continued)

(58) Field of Classification Search
USPC .................................. 210/688; 252/175, 180
See application file for complete search history.

(56) References Cited

U.S. PATENT DOCUMENTS 2,076,646 A    4/1937  Ingols
2,861,078 A  * 11/1958  Miller .................. C07D 249/18
                                                    534/558
(Continued)

FOREIGN PATENT DOCUMENTS

JP    S47008281    3/1972
JP    S50019260    6/1973
(Continued)

OTHER PUBLICATIONS

Patent Cooperation Treaty, Written Opinion issued for PCT/US2011/043180, dated Feb. 29, 2012, 4 pp.
(Continued)

*Primary Examiner* — Chester T Barry
(74) *Attorney, Agent, or Firm* — Trenner Law Firm, LLC; Mark D. Trenner

(57) ABSTRACT

A metal removal system and method are disclosed. An example method includes providing a sorptive media and providing a primary ligand having an affinity for the sorptive media, the primary ligand being an amphipathic, heterocyclic metal-coordinating compound. The method also includes providing a co-ligand having an affinity for the sorptive media. During a treatment process, a metal removal response is observed to be non-proportional between expected metal removal ability based on individual metal coordination abilities of the media alone and of all ligands, and actual net metal removal capacity resulting from a heterogeneous cooperation of the primary ligand and the sorptive media and activated by the co-ligand.

19 Claims, 6 Drawing Sheets

(51) Int. Cl.

| | |
|---|---|
| *B01J 20/32* | (2006.01) |
| *C02F 101/20* | (2006.01) |
| *C02F 103/10* | (2006.01) |
| *C02F 103/16* | (2006.01) |
| *C02F 103/24* | (2006.01) |
| *C02F 103/30* | (2006.01) |

(52) U.S. Cl.
CPC ...... *C02F 2101/20* (2013.01); *C02F 2103/10* (2013.01); *C02F 2103/16* (2013.01); *C02F 2103/24* (2013.01); *C02F 2103/30* (2013.01); *C02F 2209/06* (2013.01); *C02F 2303/16* (2013.01)

(56) References Cited

U.S. PATENT DOCUMENTS

| | | | |
|---|---|---|---|
| 3,755,161 | A | 8/1973 | Yokota et al. |
| 3,870,033 | A | 3/1975 | Faylor et al. |
| 4,500,497 | A | 2/1985 | Rowley et al. |
| 4,536,189 | A | 8/1985 | Sung |
| 4,882,067 | A | 11/1989 | Johnson et al. |
| 5,112,428 | A | 5/1992 | Correa et al. |
| 5,500,126 | A | 3/1996 | Fries |
| 5,645,730 | A | 7/1997 | Malachosky et al. |
| 6,863,713 | B1 | 3/2005 | Ghosal et al. |
| 7,361,279 | B2 * | 4/2008 | Hernandez et al. .......... 210/668 |
| 7,520,994 | B2 | 4/2009 | Dong et al. |
| 7,666,813 | B2 | 2/2010 | Hoefer et al. |
| 7,976,798 | B2 | 7/2011 | Otto et al. |
| 2003/0222023 | A1 | 12/2003 | Mueller et al. |
| 2004/0178149 | A1 | 9/2004 | Hernandez et al. |
| 2004/0178385 | A1 | 9/2004 | Bispo et al. |
| 2005/0205102 | A1 | 9/2005 | Yang et al. |
| 2010/0147770 | A1 | 6/2010 | Fryxell et al. |
| 2013/0001169 | A1 | 1/2013 | Hernandez et al. |
| 2013/0161261 | A1 | 6/2013 | Widirstky et al. |
| 2015/0060365 | A1 | 3/2015 | Widirstky et al. |

FOREIGN PATENT DOCUMENTS

| | | |
|---|---|---|
| JP | 04-360879 | * 12/1992 |
| JP | 2005-500158 | 1/2005 |
| WO | WO 85002835 | 7/1985 |
| WO | WO 03018293 | 3/2003 |
| WO | WO 030180193 | 3/2003 |

OTHER PUBLICATIONS

English Translation—JP S61501077, dated May 29, 1986, 16 pp.
English Translation—JP 47-008281, 3 pp.
English Translation, JP 2005-500158, Jan. 6, 2005, 1 page.
English Translation—JP S50019260, Jun. 23, 1973, 3 pp.
Moreno-Castilla et al., Activated Carbon Surface Modifications by Nitric Acid, Hydrogen Peroxide, and Ammonium Peroxydisolfate Treatments, Langmuir, 19915, 11, 4386-7392.
Valdes et al., Effect of Ozone Treatment on Surface Properties of Activated Carbon, Langmuir, 2002, 18, 2111.
European Patent Office, Extended European Search Report dated Jul. 24, 2015 for 12860078.0, EP 2794490, 11 pages.
Patent Cooperation Treaty, International Search Report issued for PCT/US2012/071430, dated Apr. 29, 2013; 3 pages.
Patent Cooperation Treaty, International Search Report issued for PCT/US2011/043180, dated Feb. 29, 2012, 3 pages.
Chamberlin et al., Predicting Aqueous Free Energies of Solvation as Functions of Temperature, J. Phys. Chem., 2006, 110: 5665-5675.
Reger et al., Chemistry: Principles and Practice, Cengage Learning, 2009, 0 pages.
Harris, D. C., Quantitative Chemical Analysis, W. H. Freeman and Company, 2010, 9 pages.
Vannice, M. A. Kinetics of Catalytic Reactions, Springer, 2006, 3 pages.

C.P. Huang and D.W. Blankenship, "The Removal of Mercury (II) from Dilute Aqueous Solution by Activated Carbon" Water Res., vol. 18., No. 1 (1984).
A. Netzer and D.E. Hughes, "Adsorption of Cooper, Lead and Cobalt by Activated Carbon," Water Res., vol. 18, No. 8 1(1984).
B.E. Reed, "Identification of Removal Mechanisms for Lead in Granular Activated Carbon (GAC) Columns," Separation Science and Technology, 30(1), pp. 101-116 (1995).
Andrzej Wilczak and Thomas Keinath, "Kinetics of Sorption and Desorption of Copper (II) and Lead (II) on Activated Carbon, Water Environment Research," vol. 65, pp. 238-244 (1993).
Brian E. Reed and Sujith Kumar Nonavinakere, "Metal Adsorption by Activated Carbon: Effect of Complexing Ligands, Competing Adsorbates, Ionic Strength, and Background Electrolyte," Separation Science and Technology, 27(14), pp. 1985-2000 (1992).
Alan J. Rubin and Danny L. Mercer, "Effect of Complexation on the Adsorption of Cadmium by Activated Carbon," Separation Science and Technology, 22(5), pp. 1359-1381 (1987).
Margaret A. Shay and James E. Etzel, "Treatment of Metal-Containing Wastewaters by Carbon Adsorption of Metal-Chelate Complexes," 46th Purdue Industrial Waste Conference Proceedings (1992)—Reference Not Available.
John V. Accashian, et al., "Aerobic Growth on Nitroglycerin as the Sole Carbon, Nitrogen, and Energy Source by a Mixed Bacterial Culture," Applied and Environmental Microbiology, pp. 3300-3304 (Sep. 1998).
Devon A. Cancilla et al., "Detection of Aircraft Deicing/Antiicing Fluid Additives in a Perched Water Monitoring Well at an International Airport," Environ. Ed. Technol. 32, pp. 3834-3835 (1998).
C.B. Coburn, et al., "Environmental effects of engine coolant additives" (Abstract), Chemical Abstracts, vol. 130, No. 22, pp. 1052 (1999)—Reference Not Available.
Donald E. DeFord, et al., "The determination of consecutive formation constants of complex ions from polarographic data," J. Am. Chem. Soc. 73, 5321 (1951).
Cyndee L. Gruden, et al., "Fate and toxicity of aircraft deicing fluid additives through anaerobic digestion," Water Environment Research, vol. 73, No. 1, pp. 72-79 (Jan./Feb. 2001)—Reference Not Available.
G. Heath, et al., "The use of differential pulse polarography for the determination of stability constants," Jnl. Electroanal. Chem., 84, pp. 295-302 (1977).
Dana W. Kolpin, et al., "Pharamaceuticals, hormones and other organic wastewater contaminants in U.S. streams, 1999-2000: A national reconnaissance," Environmental Sci. and Technol., vol. 36, No. 6(2002).
E.P. Parry, et al., "Evaluation of Analytical Pulse Polarography," Analytical Chemistry, vol. 37, No. 13, pp. 1634-1637 (1965).
Mark Hernandez, "Investigation of selected potential environmental contaminants: benzotriazoles," EPA 560/2-77-001 (1977).
Ido Leden, "Einige potentiometrche messungen zur bestimmung de komplexionen in cadrniurnsalzlosungen," Eingengan am 24.1.41, pp. 160-181 (1941)—Reference Not Available.
Jefferey Cornell, "The environmental impact of 4(5)-Methlbenzotriazole from aircraft deicing operations," University of Colorado (2002)—Reference Not Available.
Arup K. SenGupta (editor), "Environmental separation of heavy metals," chapter 7 by Brian E. Reed, "Removal of heavy metals by activated carbon," CRC Press LLC (2002)—Reference Not Available.
D.R. Crow, "Polarography of metal complexes," Academic Press (1969)—Reference Not Available.
Stanton B. Smith, "Trace metal removal by activated carbon," Princeton University (1973)—Reference Not Available.
1 T.N. Chen," Treatment of zinc industrial wastewater by combined chemical precipitation and activated carbon adsorption," 24th Mid-Atlantic Industrial Wastewater Conference, pp. 120-134 (1992)—Reference Not Available.
Study on Treatment of Chrome-containing Wastewater with Activated Carbon Modified by Nitric Oxidation; Mingping Yang et al., Material Protection, Vol, 37, No. 9, p, 37, No. 9, section 1.2 and section 4 published on Sep. 30, 2004.

(56) References Cited

OTHER PUBLICATIONS

Patent Cooperation Treaty, International Preliminary Report on Patentability issued for PCT/US2011/043180, dated Jan. 8, 2013, 5 pages.

Patent Cooperation Treaty, International Preliminary Report on Patentability issued for PCT/US2012/071430, dated Jun. 24, 2014, 9 pages.

Patent Cooperation Treaty, Written Opinion issued for PCT/US2012/071430, dated Apr. 29, 2013, 8 pages.

Wu S, Paul Chen J (Chemical and Environmental Engineering Dep, National University of Singapore, 10 Kent Ridge, Singapore-119260): Modification of a commercial activated carbon for metal adsorption by several approaches. Indian J envir Prot 2008, 28(8), 673-5.

Streik Jr, V, Malik, DJ, Streat, M (2001) The Influence of Active Carbon Oxidation on the Preferential Removal of Heavy Metals, Separation Science and Technology, 36(15), pp. 3367-3383. Received Aug. 1, 2000, Published online: Feb. 15, 2007.

Office Action from European Patent office, dated Jun. 11, 2018, 7 pages.

Zhu, Deng, Yang and Gang, "Modifying activated carbon with hybrid ligands for enhancing aqueous mercury removal," Carbon Journal, 2009, pp. 2014-2025, vol, 47.

\* cited by examiner

METAL REMOVAL SYSTEM

PRIORITY CLAIM

This application claims priority to U.S. Provisional Patent Application No. 61/362,279 filed Jul. 7, 2010 and titled "Method and apparatus for coupling activated carbon with corrosion inhibitors and co-ligands for immobilizing heavy metals," of Hernandez, et al., hereby incorporated by reference as though fully set forth herein. The subject matter disclosed in this application is related to the subject matter described in U.S. Pat. No. 7,361,279 issued Apr. 22, 2008, but this application does not claim priority to that application.

BACKGROUND

Metal removal from water, such as mine drainage and industrial wastewater is important for many reasons, including reducing or avoiding drinking water contamination and other environmental contamination, and to comply with government regulations. Mine drainage is a byproduct of hard rock mining operations that expose sulfide containing minerals to water and oxygen, inducing hard rock mineral oxidation. Both active and abandoned hard rock mines are sources of millions of gallons of runoff each year. The runoff is generally characterized by very low pH, elevated concentrations of dissolved iron and sulfate, and depending on the local geology, a suite of other dissolved metal cations and complexes. Example metal cations found in many of these waters include zinc, copper, mercury, lead, gold, silver, cadmium, uranium, chromium, among other metals. Industrial wastewater includes that which is generated by leather tanning operations, textile manufacturing, electronic "chip" manufacturing, metal plating facilities, nuclear fuel and nuclear weapons processing, and electric power generation (both nuclear and coal), to name only a few examples.

Many of these metal-containing waters are hazardous to humans, animals, and plants, and therefore have been mandated for treatment by government regulations. There are several known approaches for removing metals from water, although none of these approaches work well for a broad spectrum of waste streams.

Among the remediation strategies that have been used to treat or otherwise recover metals from water are controlled precipitation, membrane separation processes and immobilization on ion exchange resins. Controlled precipitation is generally accomplished by adding sufficient amounts of base (e.g., carbonate addition) to a metal-containing water in order to shift chemical conditions to a point where metals have lower solubility and thus precipitate as solids. One of the disadvantages of this approach is that the alkalinity that needs to be added to the water to drive reliable precipitation of metals are well in excess of natural levels, and the corresponding reagent masses and volumes used to adjust the alkalinity can be costly. In general, precipitation processes generate large amounts of metal-laden sludge that is difficult and costly to collect and transport from the treatment site for disposal.

Ion exchange resins have also been used to remove metals from solution. Ion exchange generally involves introducing a metal-containing water through a resin bed (often configured as a packed column), to immobilize metal ions using spheroid beads, which include an active resin or zeolite. Metals are exchanged on a charge equivalent basis for nonmetal species, which are liberated into solution as the metals are sequestered from solution. Disadvantages of this approach include the resin performance being sensitive to pH (needing to operate in a narrow pH range), the effluent containing other ions, and is relatively expensive to implement. Ion exchange processes are also sensitive to the presence of suspended particulate matter through a broad range of particle size distributions, such that pretreatments are often needed.

There are other approaches, which attempt to remove metals from water. While these processes become significantly less effective, or become ineffective as pH levels drop (less than about 7).

Still other approaches attempt to use metal-coordinating organic compounds, many of which themselves participate in acid/base reactions, to enhance metal immobilization on activated carbon. These attempts use metal binding agents, such as Ethylenediaminetetracetate (EDTA), porphyrin and porphyrin-containing compounds, citrate and citrate-containing compounds and dimercaprol. Use of metal binding agents such as these, share two difficulties. There is limited enhancement of the immobilization of metals, as compared with activated carbon used alone. And process efficiency drops markedly in response to dropping pH levels (i.e., these attempts fail to be significant at pH levels less than about 4.5).

The occupational exposures, limitations and costs of alkalinity remain a major challenge in terms of engineering advancements toward developing more robust and cost-effective treatment alternatives to remediate metal-contaminated waters.

DETAILED DESCRIPTION

Figure 1:
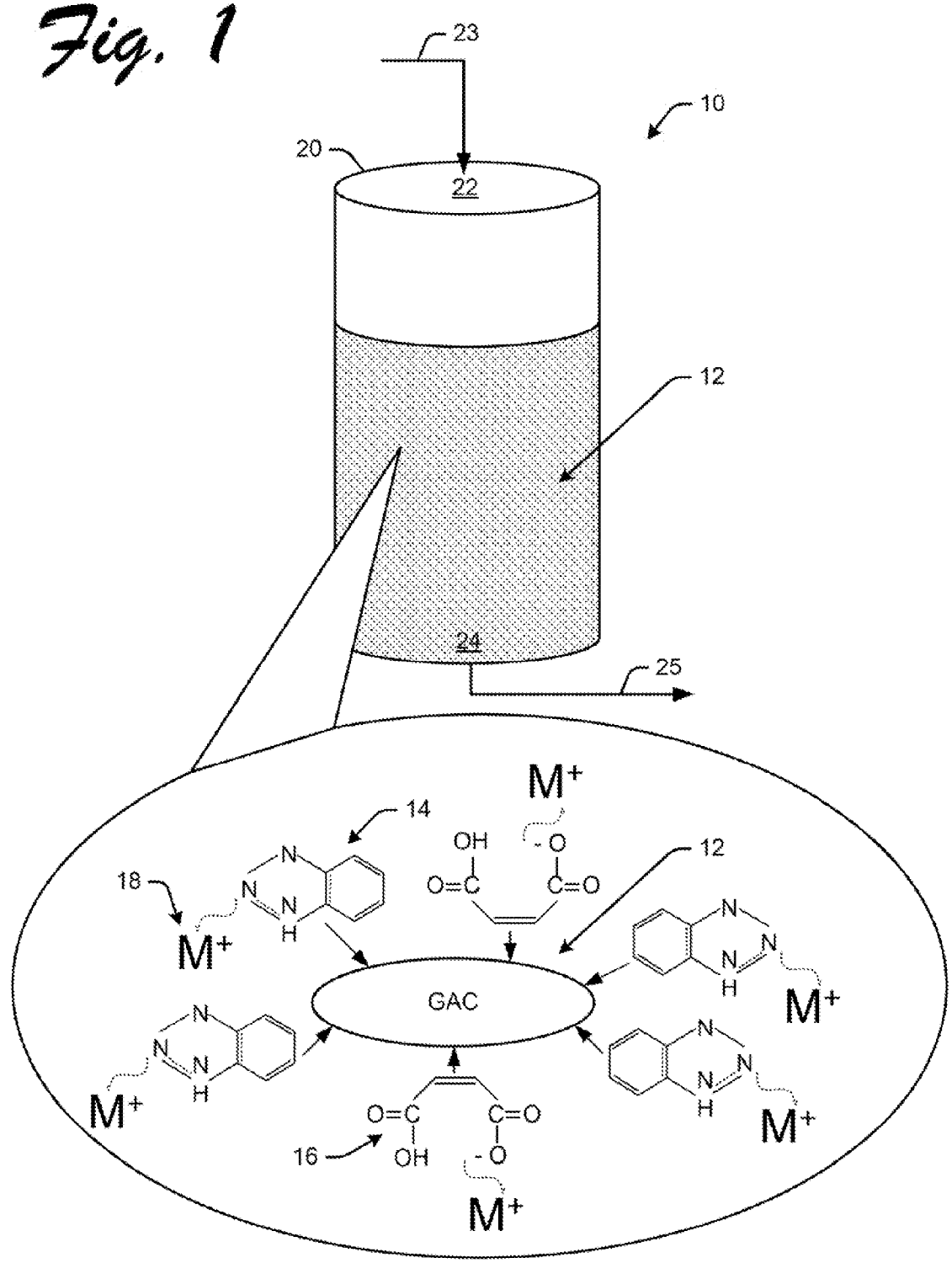
FIG. 1 is a schematic diagram showing an example system which may be used to remove metal ions from acidic solution during a treatment process.

A metal removal system and method is disclosed which may be used as a treatment process (e.g., for water, wastewater, and other solutions). The processes described herein collect metals on a sorptive media, such as activated carbon (AC) or granular activated carbon (GAC), by association of dissolved metal, primary ligand(s) and co-ligand(s). The primary ligand and co-ligand operate in combination, or permutations thereof, in a synergistic manner to remove metal ions from solution. In any event, the metal binding efficiency of activated carbon is enhanced by the presence of both primary ligand(s) and co-ligand(s).

Before continuing, it is noted that the term "primary ligand" is used herein to refer to any suitable metal-coordinating compound, which sorbs to the media of choice in the presence or absence of a co-ligand at a pH of less than about 7. A pH of less than 7 is also commonly referred to as an "acidic pH," wherein lower pH values designate increasing acidity. Examples of primary ligands include, but are not limited to, benzotriazoles, benzothiazoles, other amphipathic metal-coordinating compounds, and derivatives of either or any suitable combination of such compounds. The term "amphipathic" is understood to mean any compound having two different affinities, such as a polar moiety that is relatively hydrophilic (attracts water) and a non-polar moiety that is relatively hydrophobic (repels water). Amphipathic compounds have a molecular size and structure that allows some of the characteristic physicochemical behavior of both the hydrophobic and hydrophilic properties to manifest under germane water quality conditions.

The term "co-ligand" is used herein to refer to any suitable metal-coordinating compound having a lower molecular weight than the primary ligand, which cooperates with, or otherwise activates the host media and primary ligand to immobilize metals in a media-multiple ligand system. In an example, the co-ligand includes small molecules that contain metal-coordinating and/or chelating moieties that may or may not be heterocyclic (like benzotriazoles), but have some amphipathic character, and sorption potential to any solid media in the presence of soluble metals. In an example, the co-ligand is selected from short-chain, carboxylic acids, or other relatively low molecular weight compounds (less than the primary ligand) which contain carboxylic acid moieties which immobilize metals on sorptive media, such as activated carbons. The co-ligand (co)operates at pH of less than about 7, and its sorptive affinity and metal removal performance may be further enhanced by oxidizing the sorptive media. Suitable co-ligands include, but are not limited to short chain carboxylic acids, phosphoric acids, phosphoesters, thiols, thioesters, azides, or compounds including any or all of these moieties in any mono- or polydentate, metal coordinating chemical structure.

The use of the term "primary" ligand and co-ligand refers only to the respective quantity of each given that they are cooperative (not interfering) in their metal coordination abilities with the media or other ligands. That is, the primary ligand is provided in higher molar concentration than the co-ligand. The term "primary" does not necessarily limit an order of exposure to the metal and/or the sorptive media.

It is believed that the amphipathic property of the primary ligand strongly coordinates with dissolved metals in the solution being treated, and at the same time has an affinity for the surfaces of simple sorptive media, such as GAC. The co-ligand also coordinates with dissolved metals and has an affinity for the surfaces of sorptive media (e.g., GAC). In addition to serving on its own to coordinate with dissolved metals in the solution being treated, the co-ligand may also activate extra metal-coordinating capacity of the primary ligand significantly beyond that which would be predicted by a linear additive capacity of the ligands in an otherwise identical system independently.

In an example, a method based on the foregoing comprises: a solution having a specific acidic pH and containing metal cations (and/or complexes), adding a primary metal-coordinating (ligand) compound, and an accompanying co-ligand, in lesser or equivalent molar amounts, and a sorptive media. The addition of primary ligand and co-ligand at the specific acidic pH causes at least a portion of the primary ligand to bind with some metal cations, at least a portion of the co-ligand to bind with some metal cations, and at least some of the primary ligand to bind or otherwise adhere to a sorptive media and at least some of the co-ligand to bind or otherwise adhere to a sorptive media. Accordingly, the method associates metal cations, such that at least some of the metal in the solution is associated with the primary ligand, some of the metal in the solution is associated with the co-ligand, and some of the metal in the solution is associated with the sorptive media, and thereby removed from the solution as part of a treatment process.

Accordingly, when utilized as a metal removal system and method, metals are immobilized on the sorptive media as ions and/or complexes without precipitation. The metals may be recovered in higher concentration than the original challenge; and, the sorptive media may be regenerated and recovered for further use without generating sludge. The process is stable and works in pH ranges of less than about 7, such that large alkalinity adjustments are not needed. Advantageously, the process may be retrofit with existing treatment facilities.

FIG. 1 is a schematic diagram showing an example system 10 which may be used to remove metal ions from solution during a treatment process. Briefly, the system 10 may include a sorptive media 12 with metal-coordinating compounds. The metal-coordinating compounds include at least one type of primary ligand 14, and at least one type of co-ligand 16. The primary ligand 14 and co-ligand 16 each have an affinity for the sorptive media, such that the primary ligand 14 and co-ligand 16 bind with or otherwise adhere to the sorptive media. As defined above, the primary ligand 14 may be any suitable amphipathic, heterocyclic metal-coordinating compound. In an example, the primary ligand may be selected based at least in part on a charge distribution which maintains at least approximately, a charge neutrality at pH of less than about 7. The co-ligand 16 may be any suitable metal-coordinating compound having a lower molecular weight than the primary ligand. During a treatment process (see, e.g., FIG. 2), the primary ligand 14 and the co-ligand 16 cooperate to remove metal ions 18 from a solution which is being treated. The metal ions 18 are collected on the sorptive media 12, which can be replaced and/or regenerated when the sorptive media 12 is at or near capacity.

In an example, the system 10 includes a vessel 20. Although shown in FIG. 1 in schematic form, the vessel 20 may be implemented as a column or plurality of columns connected in parallel and/or series. Other examples are also contemplated, such as the use of cartridges, or batch processing environments. The vessel 20 has an inlet end 22 for receiving the solution to be treated (influent 23), and an outlet end 24 for discharging the treated solution (effluent 25). Vessel 20 contains the sorptive media 12.

Primary ligand 14 and/or co-ligand 16 may be added in combination with the sorptive media 12 in the vessel 20, and cooperate in synergistic and non-linear interactions during a treatment process to efficiently remove metal ions 18 (designated $M^+$ in the figures) from solution. As such, the primary ligand 14 and the co-ligand 16 can provide a non-stoichiometric treatment response. That is, the metal removal capacity increases substantially more than would be expected simply by the addition of metal-coordinating ligands alone.

In an example, the sorptive media 12 may be oxidized before adding the primary ligand 14 and/or the co-ligand 16.

Oxidizing the sorptive media, such as GAC, is a well known process and therefore need not be described herein. Oxidizing methods include using a suitable oxidizing agent (e.g., nitric acid or other chemical compound that readily transfers oxygen atoms), steam, ozonation, and other oxidation processes. It is believed that oxidizing the sorptive media 12, while not necessary for all treatment processes, enhances the ability of the primary ligand 14 and the co-ligand 16 to bind with or otherwise adhere to the sorptive media. Oxidizing may also enhance the ability of the sorptive media 12 itself to adhere metal ions 18, and increases the capacity of the sorptive media 12.

It is noted that the primary ligand 14 and the co-ligand 16 may be introduced to the system 10 via any suitable means. The primary ligand 14 may be loaded onto the sorptive media 12 before the treatment process. Likewise, the co-ligand 16 may be loaded onto the sorptive media 12 before the treatment process. Indeed, the primary ligand 14 and the co-ligand 16 may both be loaded onto the sorptive media 12 before the treatment process.

In an example, loading may be implemented by, providing the sorptive media 12 in the vessel 20, and then providing a solution containing the primary ligand 14 and/or co-ligand 16 (which is different than the influent 23 for treatment), such that the primary ligand 14 and/or co-ligand 16 bind or otherwise adhere to the sorptive media 12 prior to the treatment process.

In another example, loading may be implemented by providing the sorptive media 12 in the vessel 20, and then providing solution containing the primary ligand 14 and/or co-ligand 16 during the treatment process. In this example, the primary ligand 14 and/or co-ligand 16 bind or otherwise adhere to the sorptive media 12 during the treatment process.

The loading conditions for providing the primary ligand 14 and/or co-ligand 16 may be based upon design considerations, such as the volume of sorptive media 12, flow rates, and concentration of the primary ligand 14 and/or co-ligand 16 in the influent, to name only a few examples.

It is noted that the primary ligand 14 and/or co-ligand 16 may be loaded in any suitable manner and in any desired order. For example, the primary ligand 14 may be provided onto the sorptive media 12 prior to adding the co-ligand 16. In another example, the co-ligand 16 is provided onto the sorptive media 12 prior to adding the primary ligand 14. In yet another example, the primary ligand 14 and the co-ligand 16 may be provided onto the sorptive media 12 at substantially the same time. In addition, the sorptive media may be dried prior to, and/or after, adding the primary ligand and/or co-ligands.

During a treatment process, the influent 23 (e.g., a solution containing metals to be removed) may be added to the vessel 20 through the inlet 22. The influent 23 is treated in the vessel 20 so that metals are bound to or otherwise adhered to the sorptive media 12. The sorption of metal ions is enhanced by the presence of primary ligand 14 and co-ligand 16. The treated effluent 25 is discharged through the outlet 24. Following treatment, the concentration of metals in the effluent 25 is substantially less than the concentration of metals in the influent 23.

Figure 2:
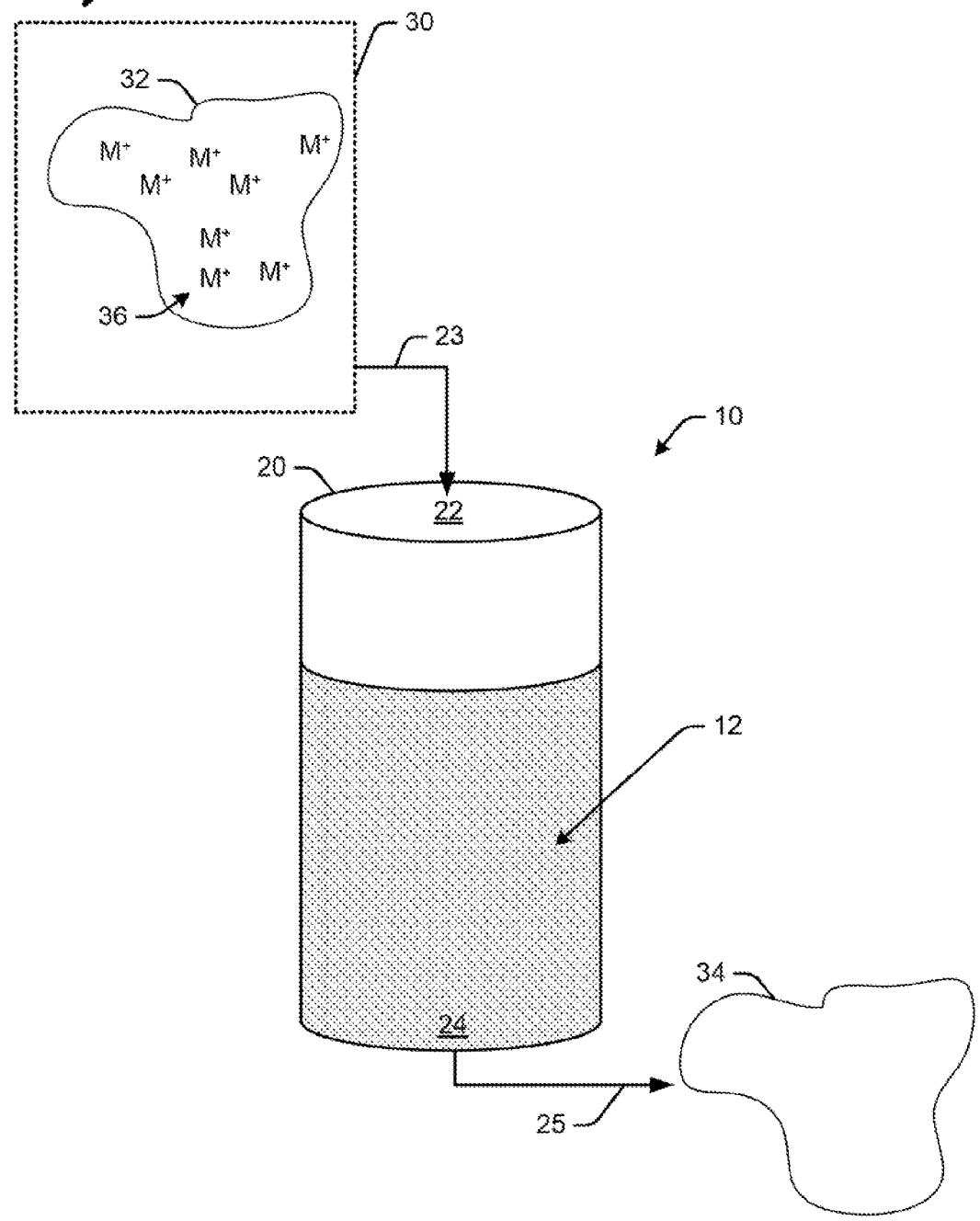
FIG. 2 illustrates at a high-level, an example treatment process.

An example treatment process is illustrated in FIG. 2. In this example, the metal removal system 10 may be implemented at a treatment site 30. The treatment site 30 may be classified or assessed as environmentally contaminated or impaired by a government agency, such as the Environmental Protection Agency (EPA) or other regulatory body. For example, the site may include runoff from a mining operation, or a holding pond for an industrial process. The treatment site 30 may also be the effluent from an industrial process, such that the effluent is treated in real-time before being discharged to the environment. Of course, the treatment site 30 is not limited to these examples.

The treatment site 30 may include contaminated water 32 or other solution, such as a contaminated lake, stream, retention pond, lagoon, or discharge stream having dissolved or other forms of metals 36. The metal removal system 10 receives the contaminated water 32 as influent, and discharges treated water 34 as the effluent. In another example, the contaminated water 32 may be removed from the treatment site 30 and treated offsite using the system 10.

As discussed above, the system 10 may include metal binding compounds, such as primary ligand 14 and co-ligand 16, which operate in cooperative conjunction with a sorptive media 12. During the treatment process, the primary ligand 14 and/or co-ligand 16 binds a metal (or metals) 36. The primary ligand 14 and/or co-ligand 16 are bound or otherwise adhered to the sorptive media 12, thus removing the metal 36 from the contaminated water 32. As noted above, the primary ligand 14 and/or co-ligand 16 may be bound to the sorptive media 12 prior to the treatment process, during the treatment process, or any combination thereof. Accordingly, the system 10 provides an efficient and sustainable means for removing metal from the site 30. The system 10 may be useful for decontamination, remediation, and/or other purposes.

It is noted that the system 10 may be used to treat any suitable source of a metal-contaminated solution such as, for example, a natural or manmade pond, an onsite holding tank, or a tank which can be attached to, and transported by any number of vehicles (land, water, or air).

Figure 3:
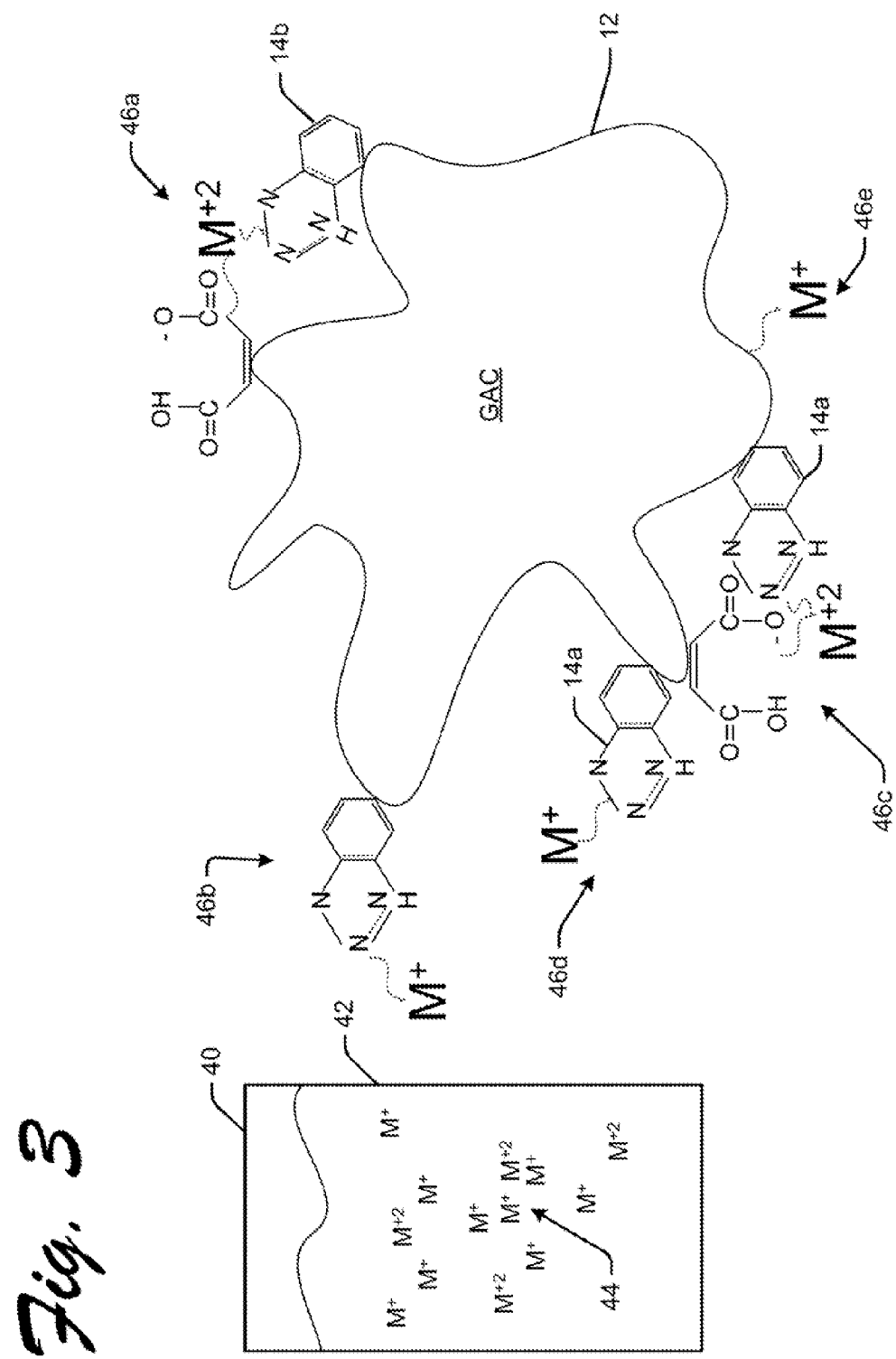
FIG. 3 shows a source containing a solution having a specific acidic pH and including metal cations (only a limited number of which are indicated in order to simplify the illustration) as a solute.

A mechanism of the treatment process may be better understood diagrammatically with reference to FIG. 3. FIG. 3 shows a source 40 containing a solution 42 having a specific acidic pH and including metal cations 44 (only a limited number of which are indicated in order to simplify the illustration), as a solute. GAC 12 is also shown in FIG. 3, having primary ligands 14 and co-ligands 16 (only a limited number of which are indicated in order to simplify the illustration) the solution 42 is treated with the GAC and ligands. As noted above, the primary ligand 14 may be sorbed to the GAC in advance of the treatment process, and/or the bound complexes (ligands with metal cations) may be sorbed to the GAC 12 during the treatment process.

It is noted that not all of the primary ligand 14 and/or co-ligand 16 are required to be in an appropriate state to bind to the sorptive media 12. Only a sufficient proportion is needed at the pH of interest to bind, so as to provide for acceptable process execution.

During the treatment process, the ligands 14 and 16 begin to bind metal cations 44. It is understood that, with certain metals, more than one of the primary ligand 14 and/or co-ligand 16 may be needed to bind each cation. For example, two ligands (each having an electronegative charge of −1) may be needed to bind a copper (Cu) metal cation (having an electropositive charge of +2). This is illustrated by the bound complex 46a It is noted that the primary ligand 14 and the co-ligand 16 may operate in combination with one another, or permutations thereof. That is, the removal of a metal cation $M^+$ can be by operation of a primary ligand 14 (or a plurality of primary ligands), as illustrated by the bound complex 46b. Removal of a metal cation $M^+$ can also be by operation of a primary ligand 14 and a co-ligand 16 (or a plurality of primary ligands), as illustrated by bound complex 46c.

It is noted that the co-ligand increases the metal removal capacity of the primary ligand by itself. A plausible explanation for this enhancement is due to the relative molecular sizes of primary ligand and co-ligand, the co-ligand is able to sorb to the GAC 12 in between the binding sites of adjacent primary ligands. This can be seen by bound complex 46c, wherein a co-ligand binds to the GAC, between adjacent primary ligand 14a (bound complex 46d) and primary ligand 14b. Of course, metal cations $M^+$ may also become adsorbed directly on the sorptive media 12 without facilitation by either the primary ligands or co-ligands, as illustrated by the metal cation binding directly to the GAC at 46e.

As can be seen in FIG. 3, bound complexes are formed (only several instances of which are indicated in order to simplify the illustration) which facilitate the collection of metal cations on the GAC 12. With the presence of a sufficient amount of the primary ligand 14 and co-ligand 16, and over a suitable time period, a large percentage if not essentially all of the metal cations 44 in the solution 42 will form bound complexes. The metal-coordinating ligands, having an appropriate charge distribution at the specific pH of the solution, may be used in combination with activated carbon having sorption properties at the specific pH. That is, the bound complex may be collected by the sorptive media 12, effectively removing or sequestering the metal cations 44 from the solution 42.

It is noted that the bound complexes may be formed in solution and then bound to or otherwise adhered to the sorptive media 12, wherein the primary ligands and/or co-ligands are in a so-called "mobile phase" (or unattached to the GAC when combining with the metal cation). The bound complexes may also be formed in an already bound or adhered state (a so-called "static" or "pre-sorbed phase"), wherein the primary ligand 14 and/or co-ligand 16 are already bound or adhered to the sorptive media 12 (and then combine with the metal cation). Any combination thereof may also occur during the treatment process.

Having bound a sufficient percentage of the metal cations 44, based on various design considerations (e.g., concentration of the primary ligand 14 and/or co-ligand 16, metal cation concentration, solution pH, and the specific metal(s) being ionized), solution 42 is allowed to exit the system 10 and is considered treated effluent. The sorptive media 12 should saturate with metal from top to bottom (or in the direction of flow through the column). The sorptive media saturated with metal may be replaced and/or regenerated using suitable recovery processes.

Based on prior experiments, nominal hydraulic residence times on the order of between 10 minutes and two hours, and empty bed contact times of at least twice the nominal hydraulic residence time required to immobilize copper, lead and other metals on granular activated carbon surfaces (at least a thousand fold concentration reduction) can be achieved using commercial benzotriazole derivatives in molar excess of the metal by 30:1 at pH of about 3. The limiting residence or empty bed contact time may change according to physical conditions (temperature), pH, and ionic strength (conductivity).

For effective operation, each of the metal-coordinating ligands and the sorptive media should exhibit an appropriate charge distribution in order to effectively remove metal. In view of a specific or given pH, one of ordinary skill in the art can select an appropriate metal-coordinating ligand and sorptive media. Of course, this selection may be made to accommodate proactive adjustments of the pH.

In the instance of a solution which exhibits a highly depressed pH, for example, a pH of about 2 or lower, components that maintain an appropriate charge distribution at the depressed pH may be used. In the case of the primary ligand, Benzothiazoles and Benzotriazoles such as, for example, 4- or 5-carboxy-, 4- or 5-butyl-, nitrated- or other alkylated derivatives with pKa values less than 2.2 may be used in a depressed pH range extending below pH 2. Although any other suitable compound, either currently available or yet to be developed, may be used.

In the case of the sorptive media, an L type or acidic activated carbon may be used. Again, any other suitable sorptive media, either currently available or yet to be developed, may be used. Such an implementation may be referred to as a "depressed pH configuration." While current, depressed pH configuration components are somewhat higher in cost than their "low" pH counterparts, it is considered that the additional expense of depressed pH components may be more cost effective than converting the acidic solution to a less acidic solution, at which "low" pH counterparts can operate.

It is also noted, that the sorption may be enhanced at pH levels above those corresponding to the first dissociation constant (pKa) of the metal-coordinating ligands. In this sense, the depressed pH configuration is considered to provide a synergistic and highly advantageous response in depressed pH solutions.

The techniques described herein have been demonstrated to be particularly effective in the pH range between about 2 and 4, but are not limited to applications in this range. Certain combinations of sorptive media and metal-coordinating ligands with pKa values less than about 2 can also be used in extremely depressed pH conditions. In situations where it is desired to remove particularly hazardous contaminants to the greatest extent possible, a depressed pH configuration may be a viable option. The use of a depressed pH configuration, at any pH range less than about 7, can also be considered when very high ionic metal contamination levels are present, since it is thought that, in a depressed pH configuration, corresponding to the pH range where the primary ligand and/or co-ligand is relatively charge neutral, the techniques described herein are capable of removing correspondingly higher amounts of contamination.

Conditions which influence the chemical mechanisms, to a significantly lesser degree than acidity, have been found to be generally consistent with what is typically found in metal-laden wastewaters. Acceptable conditions include, as examples, relatively low ionic strength, relatively low-organic matter concentration and relatively low levels of particulate matter. Remediation approaches for any of these factors, if found to be problematic in a specific scenario, will be readily known by those having ordinary skill in the art after becoming familiar with the teachings herein. Such remediation approaches include, but are not limited to simple sedimentation, coagulation and/or filtration processes.

Having described an example system and method of removing metal from solution, the following discussion is provided as an example of the theory believed to be at work. Of course, this discussion is provided for purposes of illustration and is not intended to be limiting.

Figure 4A:
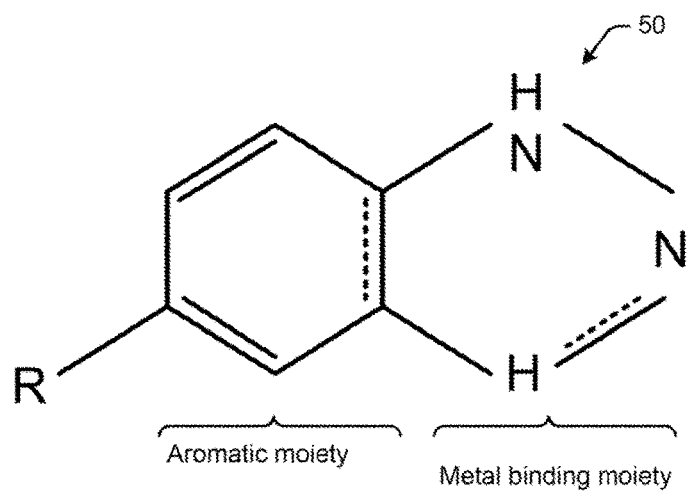
FIG. 4a shows a general chemical structure of an example primary ligand which may be utilized at an acidic pH.

FIG. 4a shows a general chemical structure 50 of an example primary ligand. In this example, the primary ligand is a benzotriazole derivative. The function group (R) represents any of the following functional groups: $-(CH_3)_n$, $-COOH$, $-NO_2$. Many metal ions bind nearly irreversibly to triazoles. Accordingly, this unique chemical architecture (an aromatic ring conjugated to a triazole ring) imparts a strong amphipathic behavior and allows them to bind metal ions while simultaneously maintaining a strong surface sorption character. Considering the physical chemistry of benzotriazoles, it is the triazole ring that is responsible for the superior metal-binding properties of these compounds. But it is the aromatic (phenyl) moiety that governs their surface-active character and thus sorption potential, which is variable.

Many benzotriazole derivatives exist, and at least one in particular, carboxybenzotriazole (CBT), strongly sorbs to oxidized activated carbon. It is noted that CBT is a weak diprotic acid, and its sorption potential on activated carbon is due to its unique structure and molecular charge distribution in different pH ranges. Recently, the sorption and metal binding behavior of CBT was formally modeled on activated carbon using widely accepted isotherms. L-Type activated carbon laden with CBT effectively scavenged copper, lead, and silver from an acidic waste stream (pH of about 3), such that concentrations could be reduced two orders of magnitude in less than 10 minutes (from about 100 ppm to less than 0.25 ppm) through a broad range of temperatures (about 5 to 20° C.) and ionic strength (about 0.01 to 0.4 M). CBT enhanced the ability of activated carbon to sequester metals in the case of copper, lead and silver. A near complete recovery of the copper and lead immobilized on selected activated carbons hosting CBT may also be achieved by washing the metal laden carbon at pH of about 0.

Based on the physical chemistry of benzotriazole-activated carbon interactions, there is strong evidence to suggest that the metal-binding capacity of benzotriazoles impregnated in and/or on sorptive media as an (aqueous) metal removal system, may be leveraged in a synergistic fashion with co-ligands that have lower molecular weights.

Figure 4B:
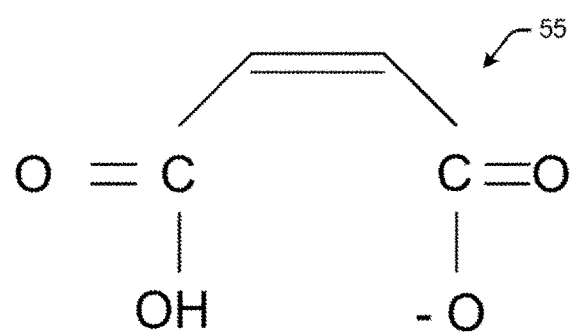
FIG. 4b shows a general chemical structure of an example co-ligand which may be utilized at an acidic pH.

A general chemical structure 55 of an example co-ligand is shown in FIG. 4b. Co-ligands are characterized by properties such that at acidic pH, they sorb to activated carbon, retain some amphipathic character in acidic pH ranges, and coordinate (and/or chelate) metal ions and their complexes regardless of the presence or absence of activated carbon.

In addition, it can be seen by comparing the general chemical structure of the primary ligand 50 shown in FIG. 4a, with the general chemical structure of the co-ligand 55 shown in FIG. 4b, that the co-ligands are structurally smaller than the primary ligands, thus enabling co-ligands to adhere to the sorptive media in spaces (steric availability) as well as local electrochemical conditions that might not otherwise be available for adhering the primary ligands. For example, the co-ligands may bind to the sorptive media in spaces between two adhered primary ligands, or even within the smaller pores formed within the sorptive media. This may also help to explain the non-stoichiometric response exhibited by the cooperation of primary ligands with co-ligands to remove metal from solution.

Direct observations of GAC, Benzotriazoles (CBT), and exemplary co-ligands, maleic and chloroacetic acid, alone and in combinations, demonstrate a synergistic relationship between benzotriazoles and these co-ligands in terms of the metal removing capacity, as demonstrated by the following Examples.

EXAMPLES

The examples included herein demonstrate the potential for using a sorptive media with a primary ligand in cooperation with a co-ligand, to enhance metal removal from solution. The improved response is non-stoiciometric when compared to using a primary ligand alone. In these examples, the sorptive media was GAC, the primary ligand was benzotriazole, and the co-ligands were chloroacetic acid and maleic acid, fumaric acid, and associated anions. However, the system and method described herein is not limited to these examples, and the examples are only intended to be illustrative.

Copper was chosen as the metal to be removed from solution for these examples, because copper is on the EPA priority pollutant list and is extremely toxic in low concentrations; is significant with regards to ecosystem toxicity and is a significant constituent of a broad range of metal laden industrial wastewaters; and, the results could be compared to the metal removing performance of prior systems including only benzotriazole and GAC. It is noted, however, that there is no reason to believe that the process will be any less effective with other metals, including metal radionuclides.

Column tests were executed to estimate the flow-through capacity that benzotriazole-laden carbon columns have for selected metals in the presence and absence of selected co-ligands. Flow-through column tests are commonly used to estimate critical performance parameters, and estimate costs for the potential scale-up of a sorption-based process. While laboratory-scale column studies cannot predict the full-field performance of a particular sorption process, they do yield reliable indicators of successful performance, as well as provide estimates for chemical reagent demands and capacity, which are critical for pilot scale up. Since the diameter to length ratio (D:L) of any "column" is a physical factor affecting performance of any plug flow process, a pilot scale test yields conservative estimates of reagent demand with respect to larger units. This is due to the effective immobilization area increasing with the square of the column diameter, while it increases linearly with the length.

The column design (D:L) used for these examples was adapted from peer-reviewed engineering literature modeling the sorption behavior of other metal chelating compounds on laboratory-scale activated carbon columns. A D:L ratio of approximately 10:1 was used throughout the study to estimate the flow through capacity and effective run times of Benzotriazole/GAC/co-ligand systems to immobilize selected metals.

Using protocols that are commonly applied for the pre-design of activated carbon columns in water treatment plants, flow-through assays were carried out in small columns (burets) that were packed with granular activated carbon, and fitted with a calibrated flow control. In one laboratory-scale example, 500 mL Pyrex™ burets were fitted with Teflon-valves and maintained at constant pressure and constant temperature, while metal-laden water flowed through a packed bed of granular activated carbon mixed with benzotriazoles. The resulting metal holding capacity was used to indicate the scale-up potential as well as provide a cost basis.

This type of lab scale experimental design is widely-accepted. The design offers the ability to control flow rates, as well as activated carbon content and porosity. Flow-through tests were executed in the following example to determine the optimum benzotriazole and ligand application process for continuous operations.

Regardless of application, the critical factors affecting the cost-effectiveness of these types of engineered treatment processes include: kinetics (or how fast the sorptive process reliably occurs), and capacity (or how much contaminant can be removed per unit volume applied).

In one example, to demonstrate a mobile phase, metal solutions were both mixed and equilibrated with benzotriazoles and/or co-ligands for an hour prior to introduction to the GAC packed columns. Accordingly, the metal complexes were formed in solution prior to their immobilization on GAC. In small column experiments, one gram of selected activated carbon was packed into Teflon tubes with an internal diameter of 4.86 mm, and the length of the carbon bed was 120 mm. Both ends of these mini-columns were sealed with glass wool.

To demonstrate co-ligand effects, chloroacetic (for Cu), formic or maleic acid (for Ag, Pb) were adjusted to different pH values by 1M NaOH or 1M $HNO_3$. The solutions were pumped through the column in an upflow mode using a peristaltic pump at a flow rate of 30 mL/hr (i.e., an empty bed contact time (EBCT) of 4.2 minutes).

In another example, to demonstrate a pre-sorbed phase, the activated carbon was first impregnated with benzotriaozles and co-ligands, prior to introducing the metal solutions. Impregnation was by introducing 100 mL of co-ligand solution through the column by peristaltic pump at a flow rate of 10 mL/hr. This process ensured that the carbon was nearly saturated, or saturated at least from a practical standpoint, with benzotriazoles and co-ligands. After that, the columns were dried at 90° C. for 2 days. In addition, the glass wool sealing the column was replaced with a fresh glass wool to avoid any triazoles containing residuals. During introduction of the metal solution, columns were manipulated such that there were negligible levels of benzotriazole free in solution during the metal removal process. This was achieved by soaking the GAC to near saturation, and rinsing the GAC to remove unbound benzotriazoles and co-ligands (if any) prior to the introducing test solutions containing the metals to be removed.

Metal-containing solutions were then introduced to GAC treatment process using GAC, with benzotriazoles both with and without co-ligands present. For metal capacity assessment, metal containing solutions with a concentration of approximately 0.5 mmol/L were pumped through the columns. The effluent samples were accumulated with a fraction collector and analyzed for metal and benzotriazoles content.

In all examples, benzotriazoles were measured using a high performance liquid chromatograph (HPLC), Spectra Physics Model 5880, utilizing a UV detector. Mobile phase for HPLC was prepared by dissolving 0.65 g K2HPO4 and 0.5 ml H3POy in 1 liter of deionized H2O added to 430 mL of HPLC-grade acetonitrile and additional acetonitrile was added by a proportioning valve during the analysis. The solution was vacuum filtered through a 0.2 μm nylon remove any particulates. Column: Zorbax Rx-C8, 4.6 mm×250 mm (Agilent, USA). Flow rate: 1.0 ml/min. Wavelength=254 nm. Injection volume: 200 μl. Detection limit: below 0.1 ppm.

Effluent metal concentrations were measured using a flame atomic adsorption spectrometer (Analyst AA 100 and Model 3100 PerkinElmer, USA) or by inductive coupled plasma/atomic emission spectroscopy (ARL 3410 ICP/AES).

Afterward, the columns were backwashed using 100 mL of 1M sulfuric or nitric acid solutions in an upflow mode to recover the metal and to regenerate the column. The maximum metal adsorption capacity of carbon columns was estimated by measuring metal concentration in the backwash solution. Triplicate column tests were conducted for 5 pH points and for each type of column.

Figure 5:
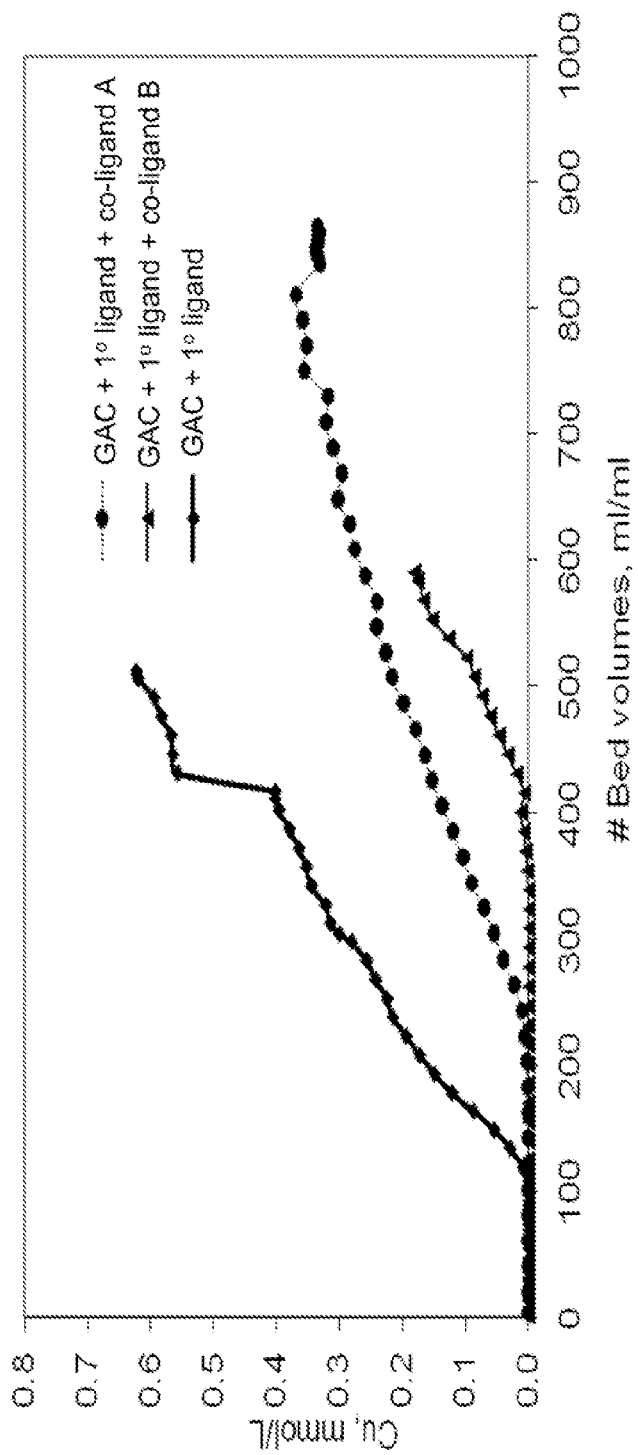
FIG. 5 shows results obtained for columns isolating co-ligand performance as a process variable at pH 3, where the molar ratio of CBT to co-ligand was 12:1, and the influent copper concentration was approximately 0.5 to 0.7 mmol.

FIG. 5 shows results obtained for columns isolating co-ligand performance as a process variable, where the molar ratio of CBT to co-ligand was 12:1, and the influent concentration was approximately 0.5 to 0.7 mmol. As judged by column studies, the addition of the co-ligand A, chloroacetic acid (●), improved copper breakthrough performance by more than 100% over GAC impregnated with CBT alone (♦). The addition of the co-ligand B, maleic acid (▲), improved copper breakthrough performance by more than 250% over GAC impregnated with CBT alone (♦).

The results from these examples empirically demonstrated that GAC, a primary ligand, and co-ligands can exhibit a synergistic relationship in terms of the metal removing capacity. A non-stoichiometric metal immobilization response is demonstrated when considering the metal coordinating capacity of a co-ligand.

Figure 6:
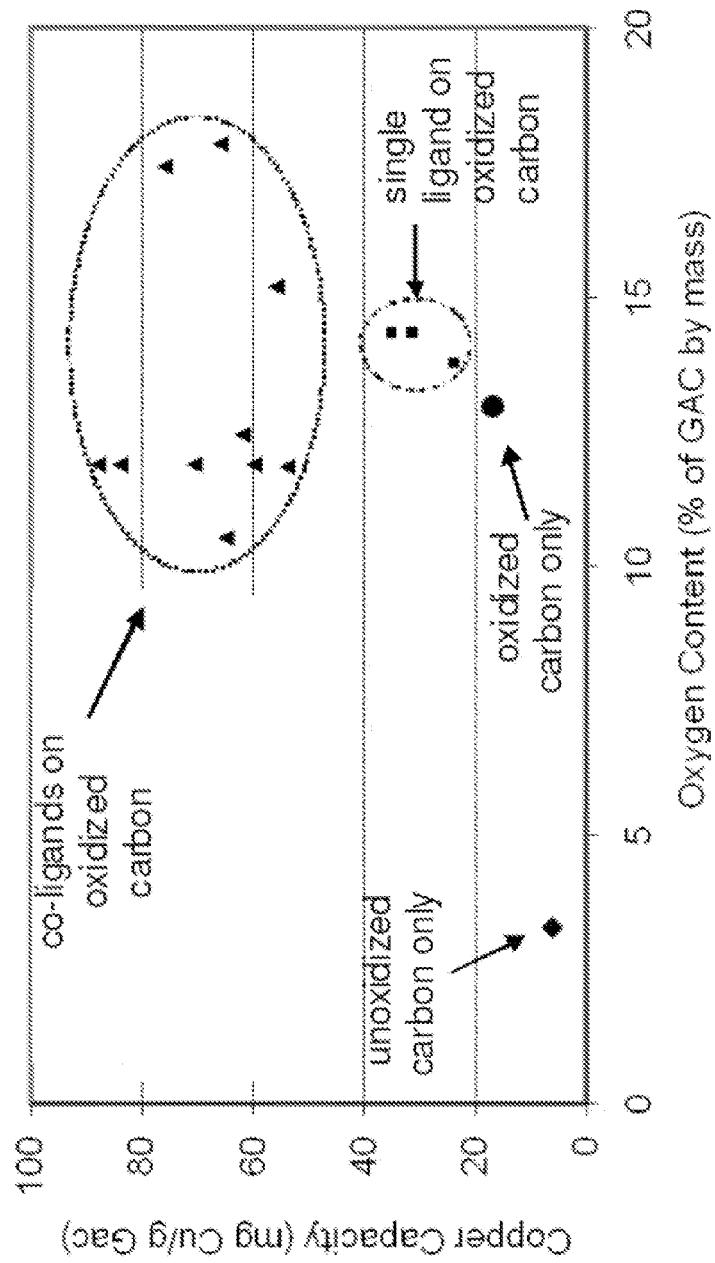
FIG. 6 is a plot showing an example of mass normalized copper removal capacity of otherwise identical activated carbon that was subject to oxidation and/or subsequent impregnation with primary and co-ligands under acidic conditions (pH 3).

FIG. 6 is a plot showing correlation of oxygen association and ligand incorporation with the metal removal capacity of activated carbon challenged with copper under acidic conditions. FIG. 7 shows results using unoxidized GAC (♦), oxidized GAC (●), GAC impregnated with a single ligand, (60 mM CBT) (■), and GAC impregnated with 60 mM CBT in the presence of co-ligands (either 5 mM chloroacetic acid or 5 mM maleic acid) (▲).

The ligands employed here (CBT, maleic acid, and chloroacetic acid) have a stable and stoichiometric content of oxygen. As a surrogate indicator of ligand association with the surface of candidate activated carbons, oxygen association of GAC can be directly measured (excluding water) using standard methods. In this example, oxygen incorporation into activated carbon was measured and correlated to metal removal capacity. Oxygen can be incorporated into the carrier of this metal removal system in two ways, either by "oxidizing" the activated carbon, or by sorbing compounds incorporating oxygen. The ligands germane to this synergistic metal removal capacity carry stoichiometric amounts of oxygen, and their association with activated carbon is presented here. It follows that increasing oxygen content of the activated carbon in the presence of oxygen-containing ligands, means that such ligands are associating (sorbing) to the activated carbon.

As judged by total metal recovery from column studies, and confirmed by the association of oxygen with GAC, the impregnation of a primary metal-coordinating ligand, CBT, significantly improved copper immobilization capacity over oxidized GAC that was not impregnated with CBT, as well as unoxidized versions of otherwise identical GAC. The addition of a co-ligand markedly increased metal immobilization capacity where oxygen content in a range of that associated with oxidized activated carbon.

In summary, the results support the following conclusions. The oxidation of selected GACs, from less than 5% oxygen to over 10% oxygen by mass, improves the carrying capacity of associating benzotriazoles as well as metals under acidic conditions.

The incorporation of a co-ligand with a primary amphipathic ligand, like benzotriazoles, even in relatively small concentrations, remarkably improves the metal retention performance of oxidized GAC under acidic conditions. The co-ligand effect is synergistic, extending metal removal capacity beyond what would be expected from either ligand alone under otherwise identical challenge conditions.

In the context of metal removal, any of the ligands observed, alone or in combination (benzotriazole and derivatives versus maleic acid, isomers, and associated anions) exhibits a synergistic potential with oxidized activated carbon beyond what could be predicted by its metal-coordinating capacity. This effect extends from and to other ligands with the physical chemical properties of the primary ligands and co-ligands observed here (ligands in this context). The ligands carry at least some amphipathic character in the acidic pH range tested, and have at least one carboxyl moiety and incorporate a heterocyclic character (benzotriazoles), or a double carbon bond (or multiple double carbon bonds) between the carboxyl moieties (e.g. maleic acid, its isomers and associated anions).

While not intending to be bound by theory, Applicants believe that at least some of the metal in the solution associates with both the primary ligand and with the co-ligand, in a unique manner such that the net of metal associating with the sorptive media in the presence of both a primary ligand and the co-ligand(s) is in excess of that association of the sum of either primary ligand or co-ligand alone (a synergistic association of primary ligand, co-ligand and sorptive media).

In this regard, Applicants have empirically demonstrated that a significant amount of metal removal capacity is associated with the presence of both the ligand and co-ligand, and that some metal would otherwise not be removed without the presence of both.

It is noted that the examples shown and described are provided for purposes of illustration and are not intended to be limiting. Other examples are also contemplated.

The invention claimed is:

1. A metal removal system, comprising:
    a sorptive media;
    a primary ligand having an affinity for the sorptive media, the primary ligand being an amphipathic, heterocyclic metal-coordinating compound selected based at least in part on a charge distribution which maintains at least approximately a charge neutrality at pH of less than about 7; and
    a co-ligand having an affinity for the same sorptive media, wherein during a treatment process, a heterogeneous cooperation of the primary ligand, the co-ligand, and the sorptive media promotes metal ion sequestration from solution such that overall metal-removal capacity of the system exceeds a simple summation of metal coordination abilities of individual ligands and the media alone.

2. The system of claim 1, wherein the primary ligand and the co-ligand cooperate in synergistic interactions to increase the net removal capacity of metals from an acid solution, and to provide a non-stoichiometric treatment response.

3. The system of claim 1, wherein the co-ligand is a cooperative metal coordinating compound, which uniquely enables a metal immobilizing synergy of a heterogeneous collective of sorption sites occupied by the primary ligand and the co-ligand, the co-ligand activating a metal immobilization capacity of the sorptive media impregnated with at least the primary ligand and one or more co-ligand in a non-parametric manner, thereby providing a response beyond what is predicted by the metal immobilization capacity of the sorptive media alone, the sorption media equilibrated with the primary ligand alone, or the sorptive media equilibrated with the co-ligand ligand alone.

4. The system of claim 1, wherein the primary ligand and the co-ligand operate in combination with one another, and permutations thereof.

5. The system of claim 1, wherein metal removal is by operation of the primary ligand, the co-ligand, and a combination of the primary ligand and the co-ligand.

6. The system of claim 1, wherein the co-ligand is a metal-coordinating compound having a lower molecular weight than the primary ligand, and the co-ligand having a distinct acid dissociation behavior and metal-coordinating capacity.

7. The system of claim 1, wherein the sorptive media is oxidized before adding the primary ligand and the co-ligand.

8. The system of claim 1, wherein the primary ligand is loaded onto the sorptive media before the treatment process.

9. The system of claim 1, wherein the co-ligand is loaded onto the sorptive media before the treatment process.

10. The system of claim 1, wherein both the primary ligand and the co-ligand are loaded onto the sorptive media before the treatment process.

11. The system of claim 1, wherein the primary ligand is provided in solution in a mobile phase during the treatment process.

12. The system of claim 1, wherein the co-ligand is provided in solution in a mobile phase during the treatment process.

13. The system of claim 1, wherein both the primary ligand and the co-ligand are provided in solution in a mobile phase during the treatment process.

14. The system of claim 1, wherein the sorptive media is dried prior to adding the co-ligand.

15. The system of claim 1, wherein the primary ligand is provided onto the sorptive media in a pre-sorbed phase prior to adding the co-ligand.

16. The system of claim 1, wherein the co-ligand is provided onto the sorptive media in a pre-sorbed phase prior to adding the primary ligand.

17. The system of claim 1, wherein the primary ligand and the co-ligand are provided onto the sorptive media in a pre-sorbed phase at substantially the same time.

18. A media for use in a treatment process to remove metal ions from solution, comprising:
    a sorptive media;
    a primary ligand having an affinity for the sorptive media, the primary ligand being an amphipathic, heterocyclic metal-coordinating compound; and
    a co-ligand having an affinity for the sorptive media, wherein a heterogeneous cooperation of the primary ligand, the co-ligand, and the sorptive media sequester metal ions from solution at an overall higher metal-removal capacity than expected from summing metal coordination abilities of the media and individual ligands.

19. The media of claim 18, wherein the primary ligand is selected based at least in part on a charge distribution which maintains at least approximately, a formal charge neutrality at pH of less than about 7.

* * * * *